US010623690B2

(12) United States Patent
Okazaki

(10) Patent No.: US 10,623,690 B2
(45) Date of Patent: *Apr. 14, 2020

(54) CAMERA SYSTEM

(71) Applicant: NEC Corporation, Minato-ku, Tokyo (JP)

(72) Inventor: Takumi Okazaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/286,862

(22) Filed: Oct. 6, 2016

(65) Prior Publication Data

US 2017/0026609 A1    Jan. 26, 2017

Related U.S. Application Data

(63) Continuation of application No. 14/435,214, filed as application No. PCT/JP2013/004859 on Aug. 14, 2013, now Pat. No. 9,503,731.

(30) Foreign Application Priority Data

Oct. 18, 2012  (JP) .................................. 2012-230424

(51) Int. Cl.
*H04N 5/917* (2006.01)
*H04N 5/232* (2006.01)
(Continued)

(52) U.S. Cl.
CPC ......... *H04N 5/917* (2013.01); *H04N 5/23206* (2013.01); *H04N 5/247* (2013.01);
(Continued)

(58) Field of Classification Search
CPC .......... H04N 5/917; H04N 5/77; H04N 19/16; H04N 19/179; H04N 19/164; H04N 19/115; H04N 5/247; H04N 5/23206
See application file for complete search history.

(56) References Cited

U.S. PATENT DOCUMENTS 6,292,098 B1  9/2001  Ebata ............... G08B 13/19656
                                              340/506
8,848,782 B2  9/2014  Ogata ................... H04N 7/181
                                              375/240.02
(Continued)

FOREIGN PATENT DOCUMENTS

CN      102111612 A    6/2011
JP    2002-351438 A   12/2002
(Continued)

OTHER PUBLICATIONS

International Search Report for PCT Application No. PCT/JP2013/004859, dated Oct. 1, 2013.
(Continued)

*Primary Examiner* — Nhan T Tran
*Assistant Examiner* — Tuan H Le

(57) ABSTRACT

Each of multiple cameras encodes and transmits a video signal captured, the encoding being performed with one of multiple variable bit rate encoding schemes each of which has a different average bit rate. A receiving device periodically measures the total bandwidth of the video signals received from the multiple cameras, and when the total bandwidth exceeds a first threshold value the receiving device switches the encoding scheme used by the cameras to a scheme having a lower average bit rate. In addition, when the total bandwidth falls below a second threshold value that is equal to or less than the first threshold value, the receiving device switches the encoding scheme used by the cameras to a scheme having a higher average bit rate.

6 Claims, 16 Drawing Sheets

(51) Int. Cl.
*H04N 5/247* (2006.01)
*H04N 19/164* (2014.01)
*H04N 19/179* (2014.01)
*H04N 19/115* (2014.01)
*H04N 19/16* (2014.01)
*H04N 5/77* (2006.01)

(52) U.S. Cl.
CPC ............ *H04N 5/77* (2013.01); *H04N 19/115* (2014.11); *H04N 19/16* (2014.11); *H04N 19/164* (2014.11); *H04N 19/179* (2014.11)

(56) References Cited

U.S. PATENT DOCUMENTS

| | | | | |
|---|---|---|---|---|
| 9,503,731 | B2* | 11/2016 | Okazaki | H04N 5/23206 |
| 2005/0036659 | A1 | 2/2005 | Talmon | G06K 9/00 382/103 |
| 2005/0226463 | A1 | 10/2005 | Suzuki | G08B 13/19656 382/103 |
| 2006/0224762 | A1 | 10/2006 | Tian | H04N 21/2187 709/231 |
| 2007/0024706 | A1 | 2/2007 | Brannon | H04N 7/17318 348/142 |
| 2007/0036515 | A1 | 2/2007 | Oosawa | G08B 13/19641 386/226 |
| 2007/0053428 | A1 | 3/2007 | Saleem | H04N 19/0009 375/240 |
| 2008/0239075 | A1 | 10/2008 | Mehrotra | H04N 7/181 348/143 |
| 2009/0204707 | A1 | 8/2009 | Kamegaya | G08B 27/005 709/224 |
| 2010/0097470 | A1* | 4/2010 | Yoshida | G08B 13/19641 348/159 |
| 2010/0158136 | A1 | 6/2010 | Peng | H04N 19/176 375/240.27 |
| 2010/0231734 | A1* | 9/2010 | Cai | H04N 5/23206 348/218.1 |
| 2010/0285844 | A1 | 11/2010 | Hosoi et al. | |
| 2011/0255590 | A1* | 10/2011 | Kim | H04N 1/00347 375/240.01 |
| 2012/0033090 | A1 | 2/2012 | Kogure | H04N 5/23206 348/207.1 |
| 2012/0265892 | A1* | 10/2012 | Ma | H04N 21/23418 709/231 |
| 2013/0100286 | A1* | 4/2013 | Lao | G06K 9/00785 348/148 |
| 2013/0254323 | A1* | 9/2013 | Bhalerao | H04L 67/2852 709/213 |

FOREIGN PATENT DOCUMENTS

| | | |
|---|---|---|
| JP | 2005-136596 A | 5/2005 |
| JP | 2006-042222 A | 2/2006 |
| JP | 2006-345208 A | 12/2006 |
| JP | 2011-139200 A | 7/2011 |

OTHER PUBLICATIONS

English Translation of write opinion for PCT Application No. PCT/JP2013/004859.

* cited by examiner

Fig.8

| NETWORK CAMERA ID | FRAME RATE HALVING PRIORITY | BLACK-AND-WHITE CONVERSION PRIORITY | IMAGE QUALITY DEGRADATION PRIORITY (BIT RATE HALVING) |
|---|---|---|---|
| 1 | 0 | 0 | 2 |
| 2 | 999 | 1000 | 998 |
| 3 | 0 | 997 | 3 |

Fig.12

| NETWORK CAMERA ID | BIT RATE REDUCTION PRIORITY |
|---|---|
| 1 | 1 |
| 2 | 1000 |
| 3 | 3 |

Fig.15

| NETWORK CAMERA ID | PRIORITY TIME PERIOD |
|---|---|
| 1 | 8:00~20:00 |
| 2 | 8:00~20:00 |
| 3 | 0:00~24:00 | though fallen in the spans, it contains captured by the system. Hence the patterns go forth.

CAMERA SYSTEM

The present application is a continuation application of U.S. patent application Ser. No. 14/435,214 filed on Apr. 13, 2015, which is a National Stage Entry of International Application PCT/JP2013/004859, filed on Aug. 14, 2013, which claims the benefit of priority from Japanese patent application No. 2012-230424, filed on Oct. 18, 2012, the disclosure of all of which are incorporated in their entirety by reference herein.

TECHNICAL FIELD

The present invention relates to a camera system including a plurality of cameras and a receiving device which receives their video signals via a network, a method for controlling a camera system, a receiving device, and a program.

BACKGROUND ART

With the widespread use of network cameras and mass storages, systems for recording video images from many cameras are more often used in real situations. To deliver video data from a plurality of cameras to one place via a network, it is important to ensure that the sum of the encoding bit rates of video signals from all the cameras is below a maximum network bandwidth.

One proposed solution, which is a first related art for the present invention, is determining individual encoding bit rates for the respective cameras so that the sum of the encoding bit rates of video signals from all the cameras is below a predefined network bandwidth (refer to PTL 1, for example). In this first related art, which is a system where video images from cameras are displayed in the corresponding display windows on a display installed on the monitoring device, in order to determine encoding bit rates for the individual cameras, temporary encoding bit rates for individual cameras are determined based on their respective window sizes, then bit rate ratios allocated for the individual cameras are calculated based on the determined encoding bit rates, and then a predetermined network bandwidth is divided according to the allocated bit rate ratios for the individual cameras as calculated. Alternatively, temporary encoding bit rates for individual cameras are determined based on their respective display window sizes, then, if the sum of the temporary encoding bit rates as determined for higher priority cameras is below a predetermined network bandwidth, these temporary encoding bit rates are determined to be the encoding bit rates for the higher priority cameras, and encoding bit rates for other cameras are determined based on the remaining bandwidth.

Another proposed solution, which is a second related art for the present invention, is providing cameras with alarm functions so that the cameras are only permitted to transmit their video signals to a monitoring device via a network to be recorded during the period when an alarm state is detected (refer to PTL 2, for example).

Another proposed solution, which is a third related art for the present invention, is interpolating video frames into a moving image section of highly dynamic motion so as to play back in fluid motion, while reducing video frames in a section of less dynamic motion (refer to PTL 3, for example).

CITATION LIST

Patent Literature

[PTL 1] Japanese Unexamined Patent Application Publication No. 2011-139200

[PTL 2] Japanese Unexamined Patent Application Publication No. 2006-42222

[PTL 3] Japanese Unexamined Patent Application Publication No. 2005-136596

SUMMARY OF INVENTION

Technical Problem

However, a camera employing Variable Bit Rate (VBR) as an encoding scheme does not always perform encoding at around an upper limit of its encoding bit rate. That is, VBR allows a higher bit rate to be allocated to complex video images, for example those of highly dynamic motion or of many variations in color to maintain the image quality while a lower bit rate is allocated to less complex images. As a result, an extra available network bandwidth will be created if some of the cameras do not use their allocated bit rates to the fullest extent. Hence, any of the first to third related arts for the present invention fails to permit the other cameras to make use of the extra available bandwidth.

An object of the present invention is to provide a camera system which overcomes the above-described problem, that is, the problem involving the inability to effectively utilize an extra available network bandwidth of conventional methods for statically allocating a divided network bandwidth to each camera so that the sum of the encoding bit rates of video signals from all the cameras is below a predetermined network bandwidth.

Solution to Problem

A camera system according to a first aspect of the present invention includes:

a plurality of cameras each of which encodes video signals captured and sends encoded video signals, the encoding being performed with one of a plurality of variable bit rate encoding schemes whose average bit rates are different from one another; and a receiving device connected to the plurality of cameras via a network, wherein the receiving device includes:

a measuring unit which periodically measures a total bandwidth of the video signals received from the plurality of cameras via the network; and a control unit which, if the measured total bandwidth of the video signals is above a first threshold value, switches from the variable bit rate encoding scheme used for the individual cameras to another one having a lower average bit rate, and which, if the measured total bandwidth of the video signals is below a second threshold value that is equal to or less than the first threshold value, switches from the variable bit rate encoding scheme used for the individual cameras to another one having a higher average bit rate.

A receiving device according to a second aspect of the present invention includes:

a measuring unit which is connected via a network to a plurality of cameras each of which encodes video signals captured and sends encoded video signals, the encoding being performed with one of a plurality of variable bit rate encoding schemes whose average bit rates are different from one another, and which periodically measures a total bandwidth of the video signals received from the plurality of cameras via the network; and a control unit which, if the measured total bandwidth of the video signals is above a first threshold value, switches from the variable bit rate encoding scheme used for the individual cameras to another one having a lower average bit rate, and which, if the measured total bandwidth of the video signals is below a second threshold value that is equal to or less than the first threshold value, switches from the variable bit rate encoding scheme used for the individual cameras to another one having a higher average bit rate.

A method for controlling a camera system according to a third aspect of the present invention is provided, wherein each of a plurality of cameras encodes video signals captured and sends encoded video signals to a receiving device via a network, the encoding being performed with one of a plurality of variable bit rate encoding schemes whose average bit rates are different from one another, and wherein the receiving device periodically measures a total bandwidth of the video signals received from the plurality of cameras via the network, and wherein, if the measured total bandwidth of the video signals is above a first threshold value, the receiving device switches from the variable bit rate encoding scheme used for the individual cameras to another one having a lower average bit rate, and wherein, if the measured total bandwidth of the video signals is below a second threshold value that is equal to or less than the first threshold value, the receiving device switches from the variable bit rate encoding scheme used for the individual cameras to another one having a higher average bit rate.

A program according to a fourth aspect of the present invention causes a computer, which is connected via a network to a plurality of cameras each of which encodes video signals captured and sends encoded video signals, the encoding being performed with one of a plurality of variable bit rate encoding schemes whose average bit rates are different from one another, to function as:

a measuring unit which periodically measures a total bandwidth of the video signals received from the plurality of cameras via the network; and a control unit which, if the measured total bandwidth of the video signals is above a first threshold value, switches from the variable bit rate encoding scheme used for the individual cameras to another one having a lower average bit rate, and which, if the measured total bandwidth of the video signals is below a second threshold value that is equal to or less than the first threshold value, switches from the variable bit rate encoding scheme used for the individual cameras to another one having a higher average bit rate.

Advantageous Effects of Invention

With the above-described configurations, the present invention makes it possible to perform controls so that the sum of the encoding bit rates of video signals from all the cameras is below a predetermined network bandwidth, as well as to effectively make use of an extra available network bandwidth, if there is the extra available network bandwidth.

BRIEF DESCRIPTION OF DRAWINGS

FIG. 8 represents an example execution priority table contained in a recording device according to the second exemplary embodiment of the present invention;

FIG. 12 represents an example execution priority table contained in a recording device according to the third exemplary embodiment of the present invention;

FIG. 15 represents an example priority determining information table contained in a recording device according to the fifth exemplary embodiment of the present invention.

DESCRIPTION OF EMBODIMENTS

Exemplary embodiments of the present invention will now be described in detail with reference to the drawings.

First Exemplary Embodiment

Figure 1:
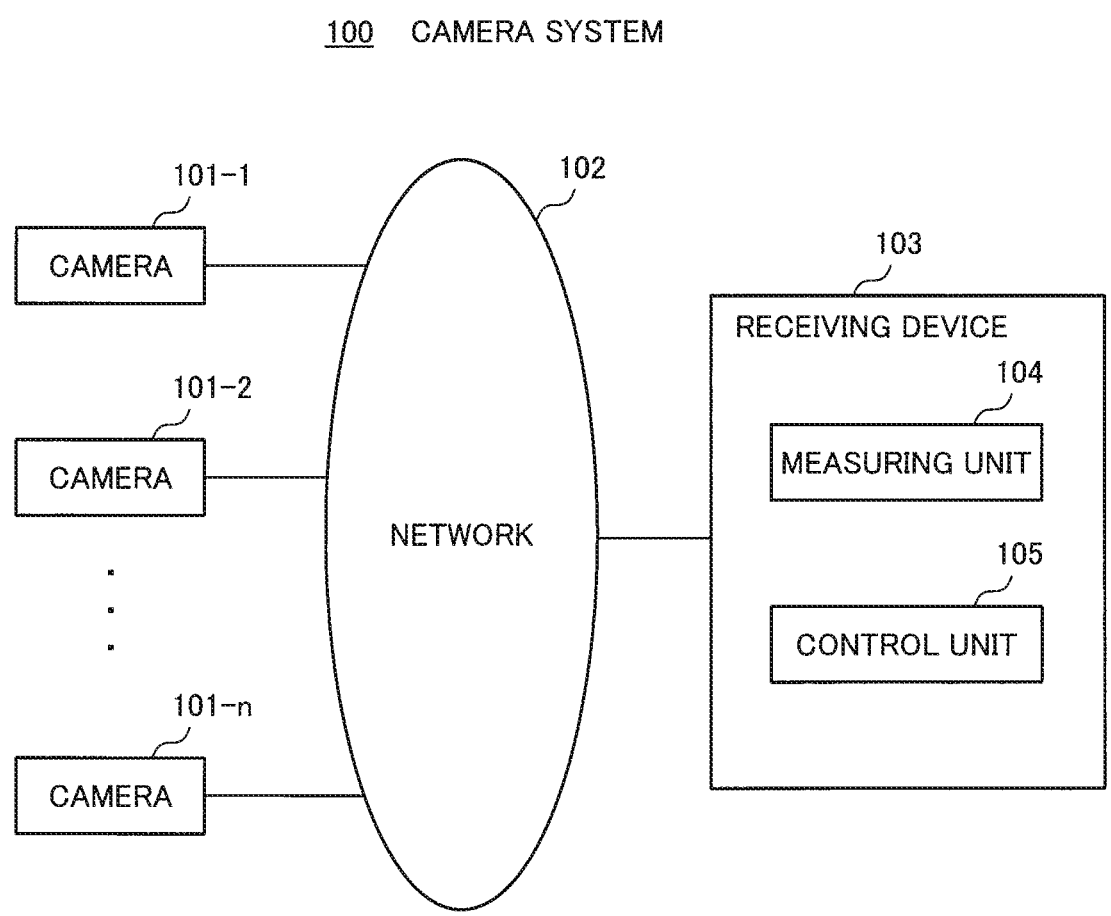
FIG. 1 is a block diagram illustrating a first exemplary embodiment of the present invention.

Referring to FIG. 1, a camera system 100 according to a first exemplary embodiment of the present invention includes a plurality of cameras 101 and a receiving device 103 connected to the plurality of cameras 101 via a network 102.

The cameras 101 are network cameras whose total number is represented by n (where n is an integer equal to or greater than 2). The each individual camera 101 has the capability to encode video signals captured using one of a plurality of variable bit rate encoding schemes whose average bit rates are different from one another. In addition, the each individual camera 101 has the capability to send the encoded video signals to the receiving device 103 via the network 102.

Examples of such plurality of variable bit rate encoding schemes having average bit rates being different from one another may include a standard variable bit rate encoding scheme (e.g., MPEG-4 AVC) and a variable bit rate encoding scheme derived from the standard scheme through modification of its parameters. For example, if frame rates can be specified with parameters, a variable bit rate encoding scheme with its frame rate halved compared with the standard variable bit rate encoding scheme will have a decreased average bit rate. In addition, if whether to encode into color or black-and-white images can be specified with parameters, a variable bit rate encoding scheme encoding into black-and-white images compared with the standard scheme encoding into color images will have a decreased average bit rate. Likewise, if quantization step sizes can be specified with parameters, a variable bit rate encoding scheme quantizing more roughly compared with the standard scheme will have a decreased average bit rate. Moreover, if average bit rates can be specified with parameters, defining various average bit rates establishes a plurality of variable bit rate encoding schemes whose average bit rates are different from one another.

Figure 2:
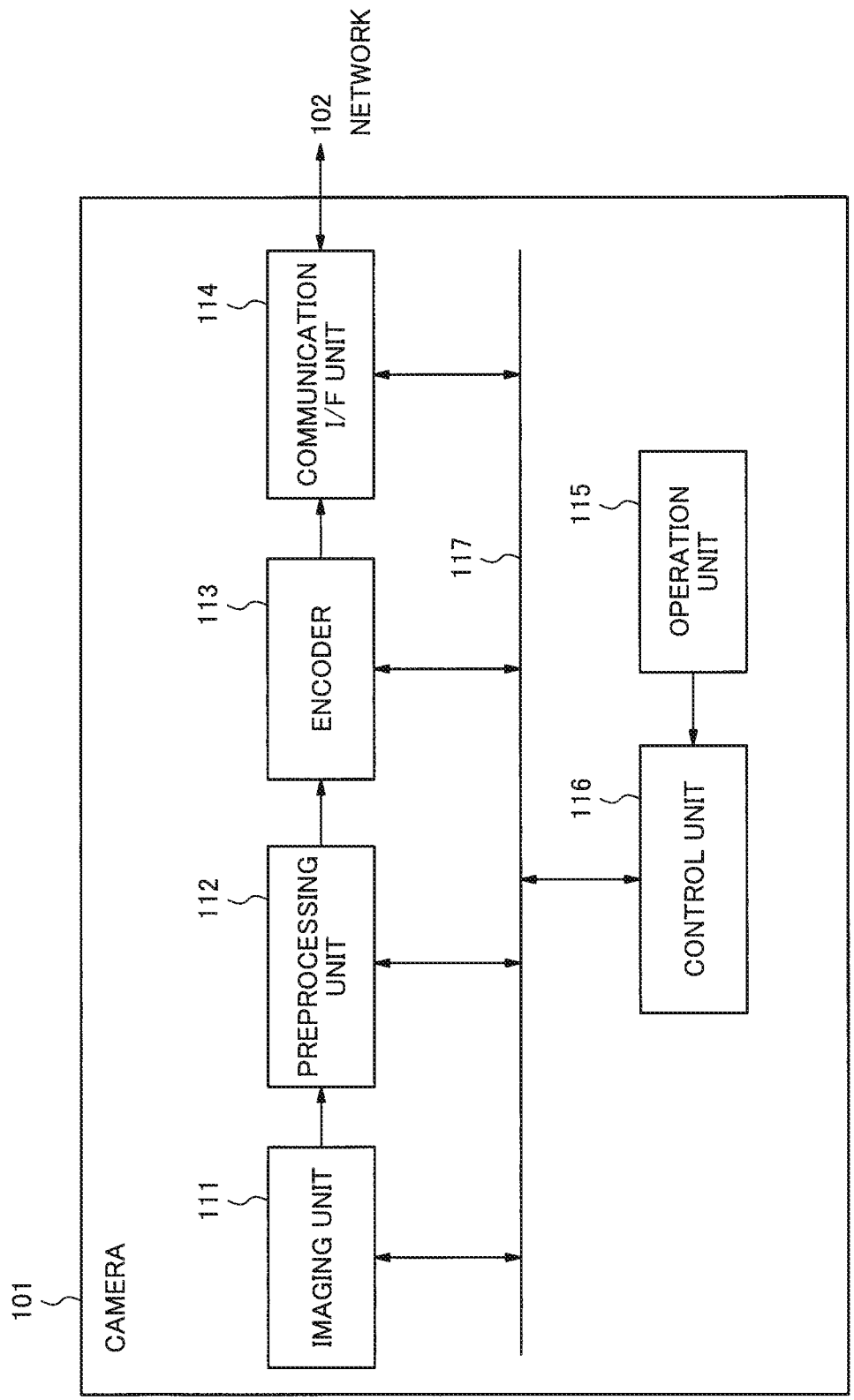
FIG. 2 is a block diagram illustrating an example hardware configuration of a camera according to the first exemplary embodiment of the present invention.

FIG. 2 is a block diagram illustrating an example hardware configuration of the camera 101. The camera 101 in this example includes an imaging unit 111, a preprocessing unit 112, an encoder 113, a communication interface (communication I/F) unit 114, an operation unit 115, a control unit 116, and a control bus 117. The imaging unit 111, which has an imaging lens and an imaging device such as a charge-coupled device (CCD) or complementary metal-oxide semiconductor (CMOS), outputs analog video signals corresponding to a captured image to the preprocessing unit 112. The preprocessing unit 112 converts the analog video signals into digital ones, makes white balance and other adjustments to generate video frames, and outputs the frames to the encoder 113. The encoder 113 performs data compression on the video frames according to a variable bit rate encoding scheme, and then outputs the encoded video signals to the communication I/F unit 114. The communication I/F unit 114 sends the encoded video signals to a receiving device 103; the unit 114 also receives instructions, such as switching between encoding schemes, from the receiving device 103. The operation unit 115 accepts various operations performed by the user and gives notification thereof to the control unit 116. The control unit 116 includes an MPU which controls components inside the camera 101 and a device like ROM or RAM which stores programs and the like.

In particular, the control unit 116 receives an instruction to switch between encoding schemes, as received by the communication I/F unit 114 from the receiving device 103, via the control bus 117, and controls the camera so as to switch from the variable bit rate encoding scheme currently used by the encoder 113 to another one having a different average bit rate.

Referring to FIG. 1 again, the receiving device 103 includes a measuring unit 104 and a control unit 105.

The measuring unit 104 in the receiving device 103 has the capability to periodically measure a total bandwidth of video signals received from the plurality of cameras 101 via the network 102.

The control unit 105 in the receiving device 103 has the capability to switch between variable bit rate encoding schemes used for each individual camera 101, based on the total bandwidth of video signals from the plurality of cameras 101 as measured by the measuring unit 104 as well as on threshold values (first and second threshold values) as determined based on an available bandwidth of the network 102 for receiving video signals from the plurality of cameras 101.

More specifically, if the measured total bandwidth of video signals is above a predetermined first threshold value that is equal to or lower than a predetermined network bandwidth, the control unit 105 has the capability to switch from the variable bit rate encoding scheme currently used for each individual camera 101 to another one having a lower average bit rate until the total bandwidth of the video signals falls below the first threshold value. The control unit 105 preferably performs the switching from the variable bit rate encoding scheme currently used for each individual camera 101 to another one having a lower average bit rate, in the order of lower to higher priorities given to the cameras 101. The priorities may be assigned to each camera or to each combination of cameras and variable bit rate encoding schemes. The priorities may be assigned statically or dynamically.

In addition, if the measured total bandwidth of video signals is below a second threshold value that is equal to or lower than the first threshold value, the control unit 105 has the capability to switch from the variable bit rate encoding scheme used for each camera 101 to another one having a higher average bit rate; provided that this switching is directed to those cameras 101 which have already switched from the variable bit rate encoding scheme used for the individual cameras to another one having a non-highest average bit rate. The control unit 105 preferably performs this switching from the variable bit rate encoding scheme used for the applicable camera 101 to another one having a higher average bit, in the order of higher to lower priorities given to the cameras 101.

Figure 3:
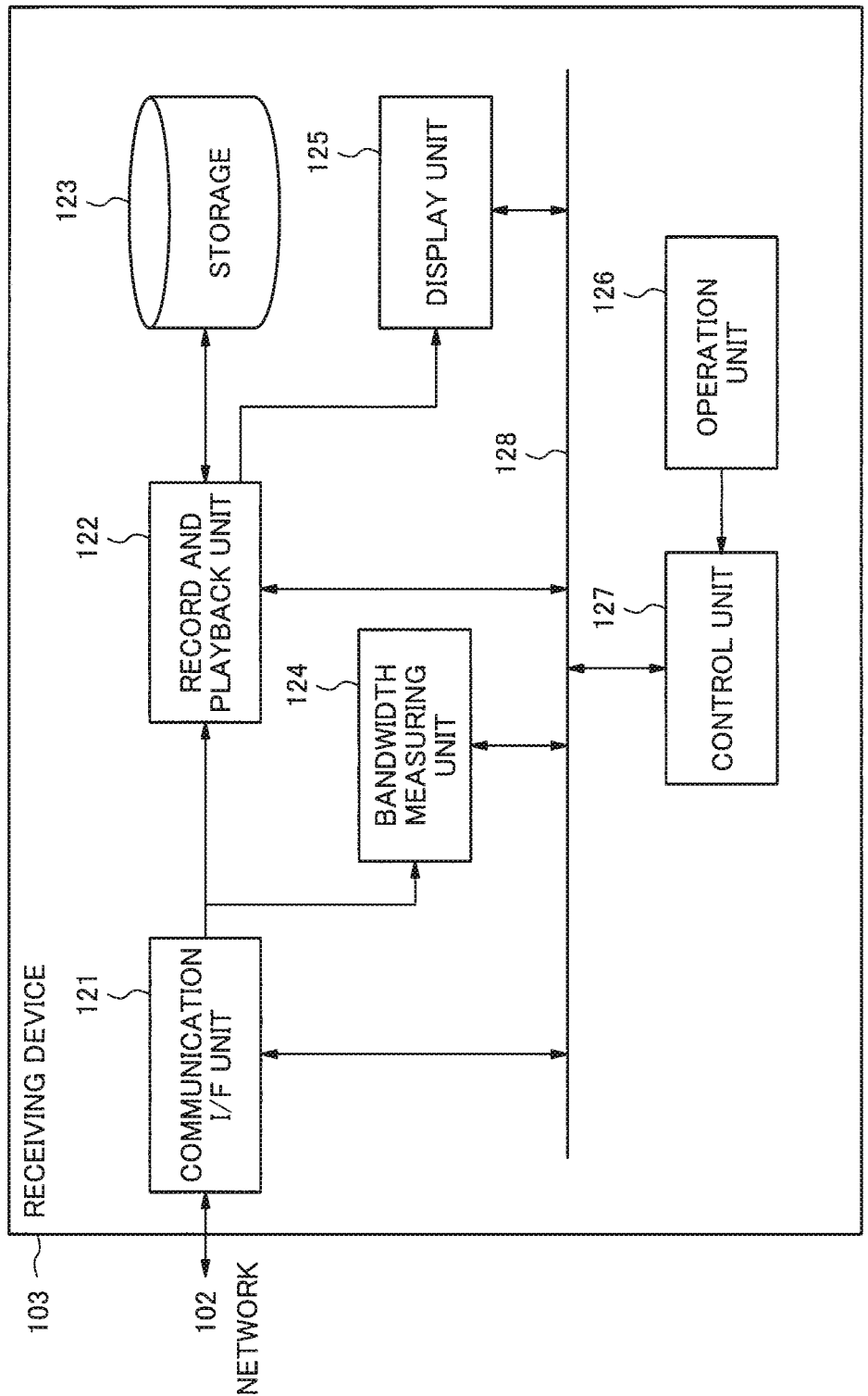
FIG. 3 is a block diagram illustrating an example hardware configuration of a receiving device according to the first exemplary embodiment of the present invention.

FIG. 3 is a block diagram illustrating an example hardware configuration of the receiving device 103. The receiving device 103 in this example includes a communication I/F unit 121, a record and playback unit 122, a storage 123, a bandwidth measuring unit 124, a display unit 125, an operation unit 126, a control unit 127, and a control bus 128. The communication I/F unit 121 receives encoded video signals from the plurality of cameras 101 via the network 102 and outputs them both to the record and playback unit 122 and the bandwidth measuring unit 124, as well as sends an instruction to switch between encoding schemes, as received from the control 127 via the control bus 128, to the specified destination camera via the network 102. The display unit 125 is configured by a liquid crystal display or the like. The storage 123 is configured by a magnetic disk device or the like. The record and playback unit 122 records (video-records) encoded video signals that are input from the communication I/F unit 121 into the storage 123 separately by camera as well as decodes encoded video signals that are either input from the communication I/F unit 121 or loaded from the storage 123 and displays the decoded signals on a screen on the display unit 125. The bandwidth measuring unit 124 cyclically measures the bandwidth of encoded video signals that are input from the communication I/F unit 121 and notifies the control unit 127 of measurement results via the control bus 128. The bandwidth measuring unit 124 corresponds to the measuring unit 104 in FIG. 1. The operation unit 126 accepts various operations performed by the user and gives notification thereof to the control unit 127. The control unit 127 includes an MPU which controls components inside the receiving device 103 and a device like ROM or RAM which stores programs, control data, and the like. The control unit 127 corresponds to the control unit 105 in FIG. 1.

The receiving device 103 illustrated in FIG. 3 implements the measuring unit 104 in FIG. 1 by means of hardware. According to the present invention, however, the measuring unit 104 in FIG. 1 can also be implemented by a processor like MPU and a program.

Figure 4:
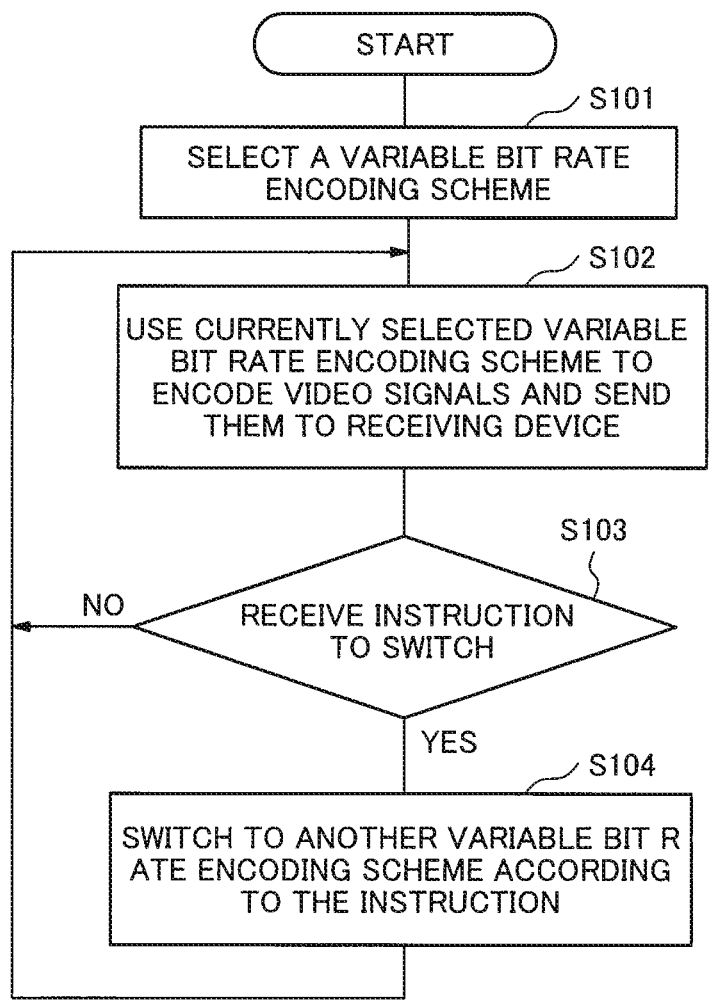
FIG. 4 is a flowchart illustrating example operations of a camera according to the first exemplary embodiment of the present invention.
Figure 5:
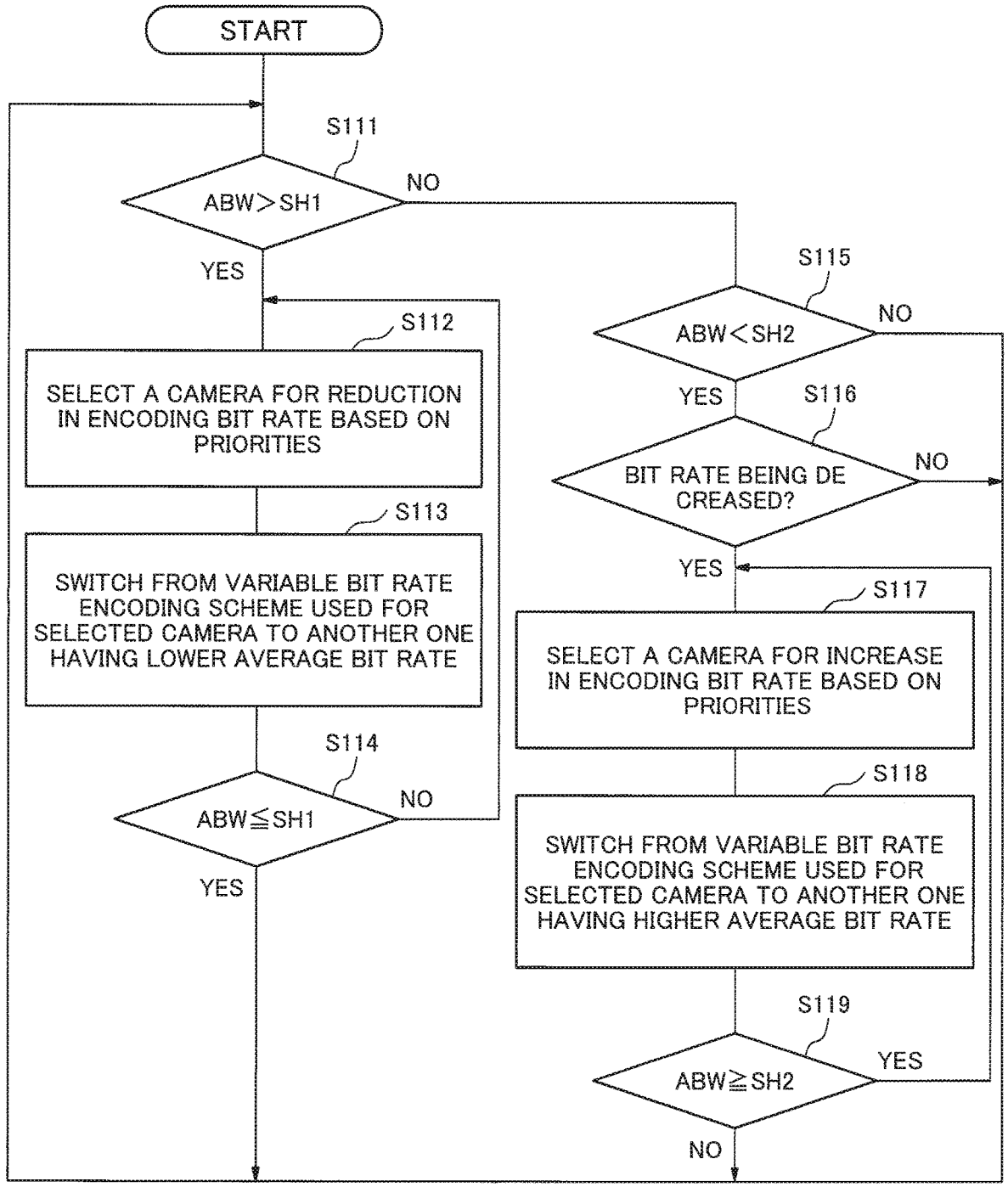
FIG. 5 is a flowchart illustrating example operations of a receiving device according to the first exemplary embodiment of the present invention.

Operations of the camera system 100 according to this exemplary embodiment will now be described with reference to FIGS. 1, 4, and 5. FIGS. 4 and 5 are flowcharts illustrating example operations of the individual cameras 101 and the receiving device 103, respectively.

First the following describes operations of the cameras 101 referring to FIGS. 1 and 4.

Each individual camera 101 selects a variable bit rate encoding scheme that it will use first (S101). Any encoding scheme may be selected at first from among a plurality of variable bit rate encoding schemes having average bit rates that are different from one another. This example assumes that the variable bit rate encoding scheme having the highest variable bit rate is selected as the one to be used first.

Then, the camera 101 encodes video images it took according to the selected variable bit rate encoding scheme and sends encoded images to the receiving device 103 via the network 102 (S102).

The camera 101 then determines whether it has received a message instructing to switch between variable bit rate encoding schemes from the receiving device 103 via the network (S103). If the camera has received a message instructing to switch between variable bit rate encoding schemes, it switches from the currently used variable bit rate encoding scheme to another one according to the received message (S104), and then returns to the processing in Step S102. If the camera has not received any message instructing to switch between variable bit rate encoding schemes, it skips the processing in Step S104 to return to the processing in Step S102.

In this way, each camera 101 performs the operations of encoding video signals captured according to one of a plurality of variable bit rate encoding schemes whose average bit rates are different from one another and sending the encoded signals to the receiving device 103 via the network 102.

Operations of the measuring unit 104 in the receiving device 103 will now be described with reference to FIG. 1.

The measuring unit 104 in the receiving device 103 periodically measures the total bandwidth (hereinafter referred to as the total bandwidth ABW) of video signals received from the plurality of cameras 101 via the network 102. Any time intervals may be used for the periodic measurements. For example, the measurements may be made at intervals of 30 seconds, one minute, a few minutes, and the like. The control unit 105 is notified of the total bandwidth ABW of video signals as measured by the measuring unit 104.

Operations of the control unit 105 in the receiving device 103 will now be described with reference to FIGS. 1 and 5.

The control unit 105 in the receiving device 103 compares the total bandwidth ABW of video signals as measured by the measuring unit 104 with a threshold value SH1 predefined and stored in memory or the like to determine whether the total bandwidth ABW is above the threshold value SH1 (S111). The threshold value SH1 is predefined so as to be equal to, or a little lower than, an available bandwidth of the network 102 to receive video signals from the plurality of cameras 101. If the total bandwidth ABW is above the threshold value SH1, the control unit 105 performs the following controls in order to reduce the bandwidth of video signals to be received.

The control unit 15 starts with selecting the individual cameras 101 whose encoding bit rates are to be reduced according to the priorities given to the individual camera 101 (S112). The control unit 105 then switches from the variable bit rate encoding scheme currently used for the selected camera 101 to another one having a lower average bit rate (S113). Specifically, the control unit 105 sends to the selected camera 101 a message instructing to switch to a variable bit rate encoding scheme having a lower average bit rate. The control unit 15 then compares the total bandwidth ABW of video signals as later notified by the measuring unit 104 with the threshold value SH1 again (S114). The control unit 115 repeats the loop processing from Step S112 to Step S114 until the total bandwidth ABW of video signals as measured by the measuring unit 104 falls below the threshold value SH1. Upon finding that the total bandwidth ABW of video signals is below the threshold value SH1, the control unit 115 returns to the processing in Step S111.

In this way, if the total bandwidth ABW of video signals sent from the plurality of cameras 101 is above the threshold value SH1, the control unit performs controls so that the total bandwidth ABW of video signals sent from the plurality of cameras 101 falls below the threshold value SH1 by increasing the proportion of the cameras 101 that operate under a variable bit rate encoding scheme having a lower average bit rate.

On the other hand, when the control unit 105 finds that the total bandwidth ABW of video signals as measured by the measuring unit 104 does not exceed the threshold value SH1, the control unit 105 compares the total bandwidth ABW of video signals with a threshold value SH2 (S115). The threshold value SH2 is a predefined value lower than the threshold value SH1. If the total bandwidth ABW of video signals is not below the threshold value SH2, the control unit 105 returns to the processing in Step S111. If the total bandwidth ABW of video signals is below the threshold value SH2, the control unit 105 determines whether the bit rate is currently being decreased or not (Step S116). "The bit rate being decreased" as used herein means the state where one or more cameras 101 have switched to a variable bit rate encoding scheme having a non-highest average bit rate. If the bit rate is not being decreased, the control unit 115 returns to the processing in Step S111.

To the contrary, if the bit rate is currently being decreased, the control unit 115 performs the following controls to effectively utilize an available network bandwidth.

From among those cameras 101 which have switched to a variable bit rate encoding scheme having a non-highest average bit rate, the control unit 115 selects, based on priorities, a camera 101 to be switched to another variable bit rate encoding scheme having a higher average bit rate (S117). The control unit 115 then switches from the variable bit rate encoding scheme currently used for the selected camera 101 to another one having a higher average bit rate (S118). Specifically, the control unit 105 sends to the selected camera 101 a message instructing to switch to a variable bit rate encoding scheme having a higher average bit rate. The control unit 15 then compares the total bandwidth ABW of video signals as later notified by the measuring unit 104 with the threshold value SH2 again (S119). The control unit 115 repeats the loop processing from Step S117 to Step 119 until the total bandwidth ABW of video signals as measured by the measuring unit 104 is not less than the threshold value SH2. Upon finding that the total bandwidth ABW of video signals is not less than the threshold value SH2, the control unit 115 returns to the processing in Step S111.

The above-described controls allows for minimization of the proportion of the cameras 101 that operate under a variable bit rate encoding scheme having a lower average bit rate, to the extent that the total bandwidth ABW of video signals sent from the plurality of cameras 101 does not exceed the threshold value SH1.

Figure 6:
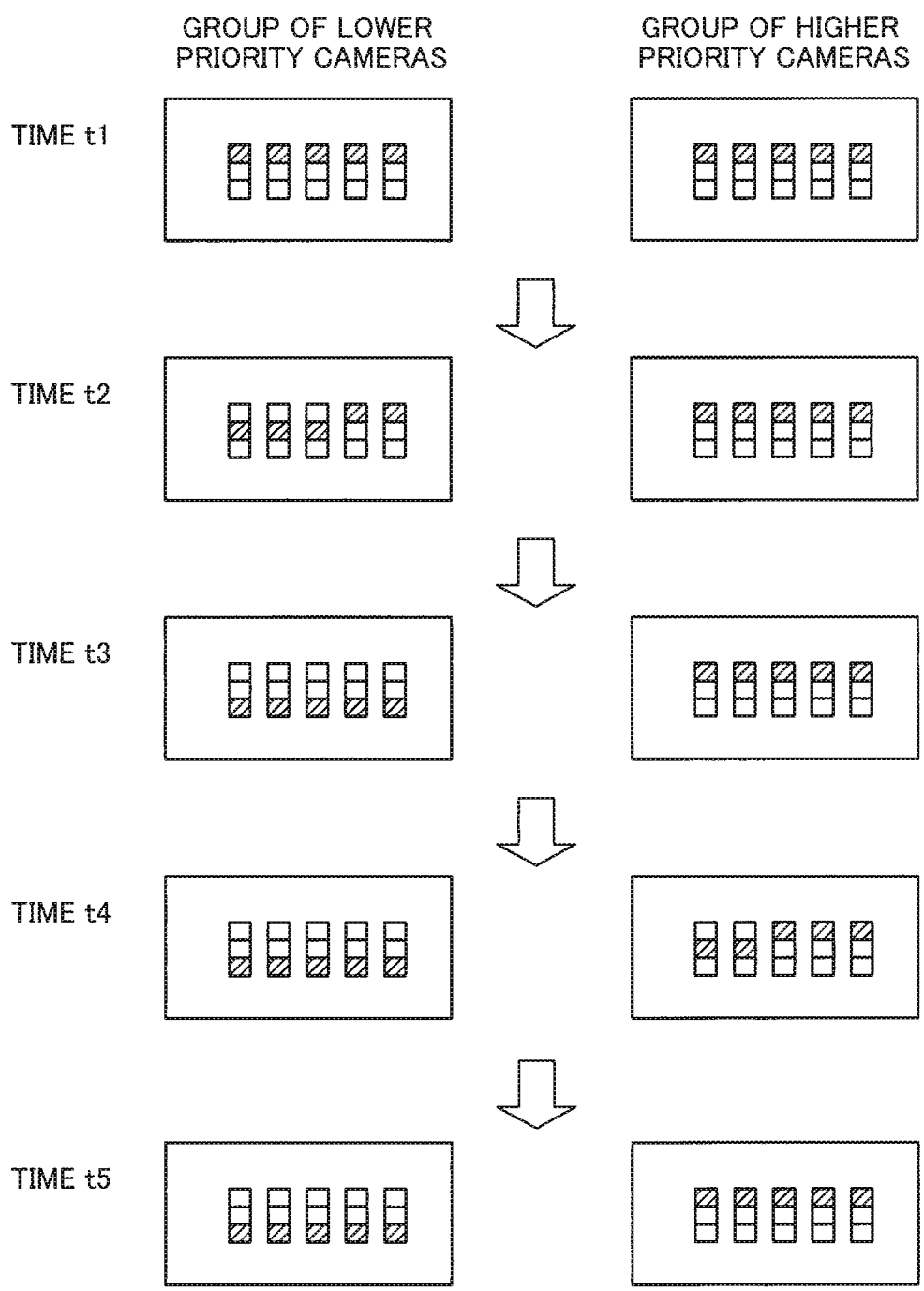
FIG. 6 is a schematic diagram illustrating transitions between operational states of cameras according to the first exemplary embodiment of the present invention

FIG. 6 schematically shows example transitions of operational states of the cameras 101. In this example in FIG. 6, the total number of cameras 101 is ten. Priorities are divided into two groups: higher and lower priority groups each of which has five cameras. A vertical stack of three rectangles represents one camera. Among the three rectangles, a black filled one indicates by its position an average bit rate level (higher or lower) of the variable bit rate encoding scheme currently used for each individual camera. That is, the example in FIG. 6 assumes that the cameras 101 each use any one of the three variable bit rate encoding schemes: a scheme having the highest average bit rate, a scheme having the second to the highest average bit rate, and a scheme having the lowest average bit rate.

At time t1, all the cameras 101 use the variable bit rate encoding scheme having the highest average bit rate to encode video signals and send encoded signals to the receiving device 103. As of time t2, some of the lower-priority cameras 101 have shifted to the state where they are using the variable bit rate encoding scheme having the second to the highest average bit rate because the total bandwidth ABW of video signals sent from the plurality of cameras 101 exceeded the threshold value SH1 for some reason such as video images captured by the cameras 101 getting complex. As of time t3, when the total bandwidth ABW has further increased, all of the lower-priority cameras 101 have shifted to the state where they are using the variable bit rate encoding scheme having the lowest average bit rate. At times t2 and t3, however, the higher-priority cameras 101 are still running with the variable bit rate encoding scheme having the highest average bit rate. This assures that video images from the higher-priority cameras 101 do not degrade in quality.

As of time t4, some of the higher-priority cameras 101 inevitably have shifted to the state where they are using the variable bit rate encoding scheme having the second to the highest average bit rate because bandwidth reduction with the lower-priority cameras is no longer sufficient to keep the total bandwidth ABW of video signals from all the cameras equal to or less than the threshold value SH1. As of time t5, however, all the higher-priority cameras 101 have returned to the state where they are using the variable bit rate encoding scheme having the highest average bit rate, triggered by the total bandwidth ABW of video signals from all the cameras falling below the threshold value SH2 for some reason such as video images captured by the cameras getting no longer complex.

As seen above, this exemplary embodiment allows for controls to ensure that the sum of the encoding bit rates of video signals from all the cameras 101 does not exceed a predetermined network bandwidth. This is because the measuring unit 104 in the receiving device 103 periodically measures the total bandwidth of video signals received from the plurality of cameras 101 via the network 102, and, if the measured total bandwidth of video signals exceeds a threshold value SH1 that is equal to or lower than the predetermined network bandwidth, the control unit 105 in the receiving device 103 switches from the variable bit rate encoding scheme currently used for individual cameras 101 to another one having a lower average bit rate until the total bandwidth of video signals falls below the threshold value SH1.

Additionally, according to this exemplary embodiment, an available network bandwidth, if any, can be effectively utilized. This is because the measuring unit 104 in the receiving device 103 periodically measures the total bandwidth of video signals received from the plurality of cameras 101 via the network 102, and, if the measured total bandwidth of video signals is below a threshold value SH2 that is equal to or less than the threshold value SH1, the control unit 105 in the receiving device 103 switches from the variable bit rate encoding scheme used for individual cameras 101 to another one having a higher average bit rate; provided that this switching is directed to those cameras which have already switched from the variable bit rate encoding scheme used for the individual cameras to another one having a non-highest average bit rate.

Moreover, according to this exemplary embodiment, when the total bandwidth of video signals from all the cameras is reduced, higher-priority cameras can maintain the quality of their video signals unlike lower-priority cameras suffering from degraded quality. This is because the cameras are configured to switch to a variable bit rate encoding scheme having a lower average bit rate in the order of lower to higher priorities given to the cameras.

Furthermore, according to this exemplary embodiment, when there is created an extra available network bandwidth, the quality of video signals from higher-priority cameras can be improved prior to lower-priority cameras. This is because the cameras are configured to switch to a variable bit rate encoding scheme having a higher average bit rate in the order of higher to lower priorities given to the cameras.

Second Exemplary Embodiment

[Features of the Exemplary Embodiment]

If a plurality of cameras deliver video data to one place to be recorded there, this exemplary embodiment makes it possible to suppress the network bandwidth without lowering the level of information provided by video images by controlling the recording mode for each network camera based on the content of video images so that the data received via the network does not exceed a permissible amount.

Problem to be Solved by the Exemplary Embodiment

In video monitoring or other applications where images from a plurality of network cameras are simultaneously recorded at one place, a provided network bandwidth needs to withstand simultaneous receiving of data coming from a plurality of network cameras. When encoding video images, a network camera employing a variable bit rate encoding scheme often allocates a higher bandwidth for complex video images, such as those of highly dynamic motion or many variations in color, in order to maintain the quality of recorded images. This conventional practice is based on, however, a determination made in a single camera, without taking account of the states of other cameras. Thus, to ensure that all the video images from these network cameras can be recorded at one place, it has been necessary to build an environment being able to receive data in a broad network bandwidth on the assumption that every network camera delivers recording data in a maximum bandwidth.

Solution Provided by the Exemplary Embodiment

In the case where pieces of video image data from a plurality of network cameras are going to be recorded simultaneously at one place, if the total bandwidth for receiving the data is likely to exceed a maximum permissible amount for the network, this exemplary embodiment provides the ability to reduce the bandwidth while minimizing degradation in level and quality of information provided by video images. This is achieved by utilizing the characteristics of the applications such as recording a lot of images, the characteristics including multiple cameras being located in the same area, some video images being almost static, and some color information being possibly unimportant; by giving priorities to individual network cameras based on importance of a video image or properties of an object being video-monitored; and by controlling color tones, frame rates, resolutions, and the like of video images to be recorded on an individual network camera basis according to the priorities.

[Configuration of the Exemplary Embodiment]

Figure 7:
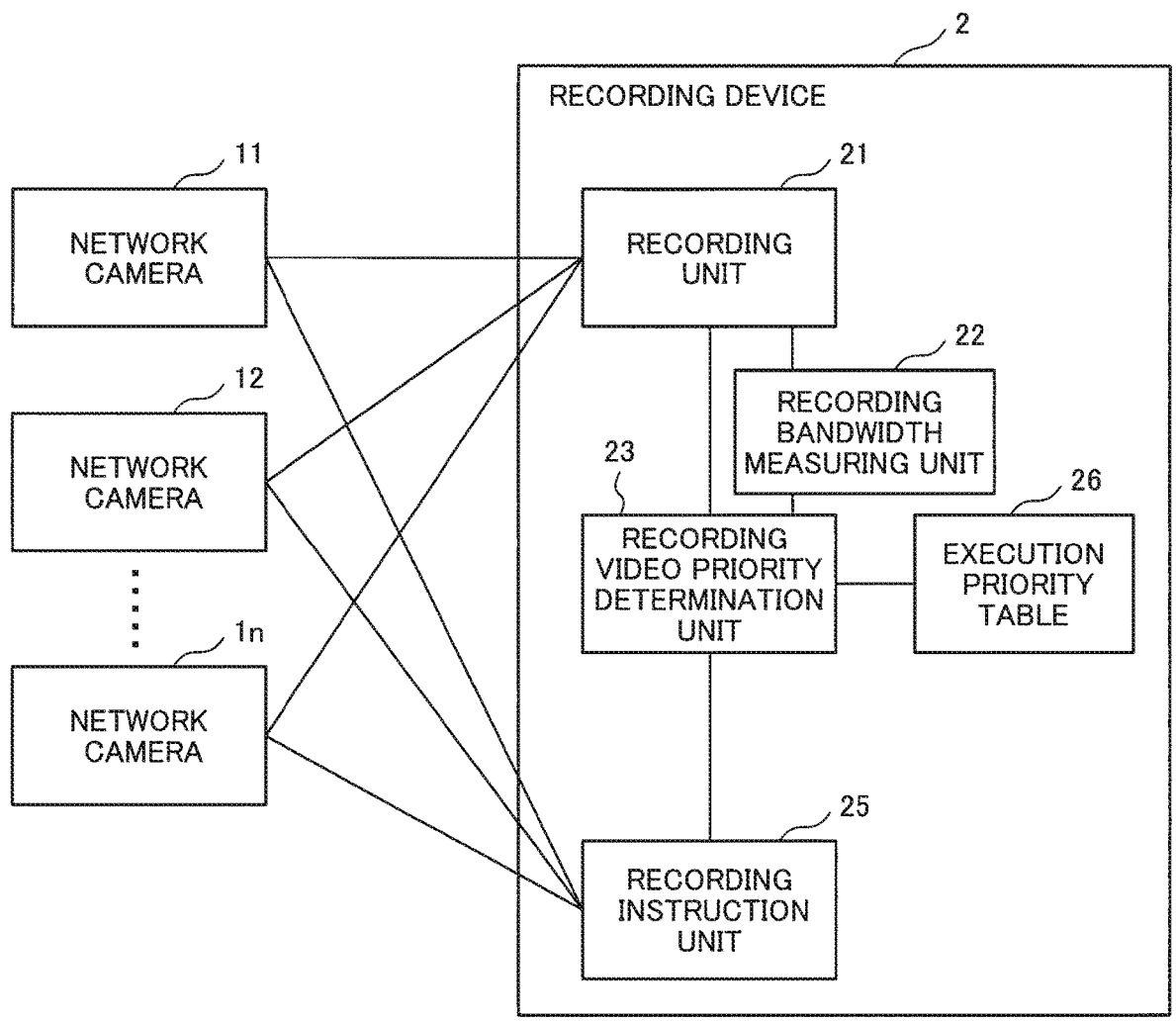
FIG. 7 is a block diagram illustrating a second exemplary embodiment of the present invention.

FIG. 7 is a block diagram illustrating an overall configuration of a camera system 200 according to this exemplary embodiment. In this exemplary embodiment, there are two or more network cameras 11 to 1n where n represents the number of cameras. The network cameras capture video images, encode them (including compression), and send the encoded video data to a recording unit in the recording device 2.

The recording device 2 is configured by the recording unit 21, a recording bandwidth measuring unit 22, a recording video priority determination unit 23, a recording instruction unit 25, and an execution priority table 26. Compared with FIG. 1, the recording bandwidth measuring unit 22 corresponds to the measuring unit 104, while the recording video priority determination unit 23, the execution priority table 26, and the recording instruction unit 25 collectively correspond to the control unit 105.

The recording unit 21 receives pieces of video data from the network cameras 11 to 1n and records them. The recording bandwidth measuring unit 22 measures respective bandwidths of data being recorded in the recording unit 21 from the individual network cameras. The recording video priority determination unit 23 uses the execution priority table 26 to select the network camera for which a bandwidth is to be reduced and the technique for the bandwidth reduction. The recording instruction unit 25 notifies the applicable network camera of the technique as selected by the recording video priority determination unit 23. The execution priority table 26 stores information for determining whether to reduce bandwidths for respective network cameras.

FIG. 8 shows an example of the execution priority table 26. The table includes IDs for identifying network cameras and execution priorities given to some techniques to reduce a frame rate. A network camera ID may be any information sufficient to identify each camera, such as a number or a unique name. This example table indicates whether to implement three different techniques: halving a frame rate, turning into black-and-white, and lowering image quality (for example, changing a quantization step size to the extent that a bit rate is halved), which are examples only; any other means to reduce a bit rate of video images may be used. The techniques may be implemented in the order of larger to smaller priority numbers, on the assumption that 0 indicates that the corresponding technique is not performed.

It is to be noted that the execution priorities contained in the execution priority table 26 shown in FIG. 8 are not consistent with, but opposite to, the priorities as determined based on importance of a video image from each network camera or properties of an object being video-monitored. That is, a larger number priority given to a network camera represents less important video images.

Figure 9:
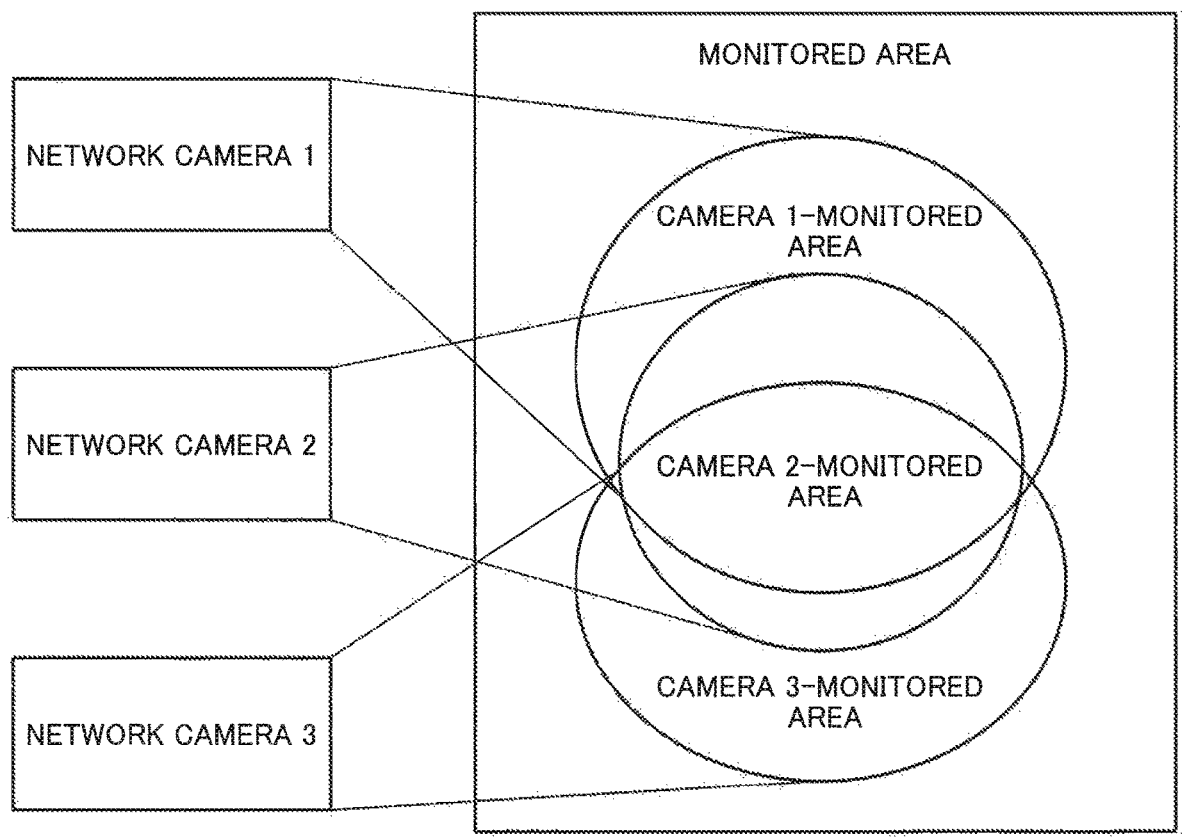
FIG. 9 is an explanatory diagram illustrating areas monitored by a plurality of network cameras, the diagram being a basis for defining the execution priority table contained in the recording device according to the second exemplary embodiment of the present invention.

FIG. 9 illustrates an example configuration of network cameras on the basis of which the execution priority table 26 will be created. It is assumed that network cameras 1, 2, and 3 are installed in the same area and that the video images captured by the network camera 2 are covered by either the network camera 1 or 3. In this configuration, any degradation in video images captured by the network camera 2 would have little influence on levels of information provided by the whole video images because the degraded images can be interpolated with images captured by the network cameras 1 and 3. This means the network camera 2 is less important than the network cameras 1 and 3. Taking this into consideration, the table will be built based on the decisions with respect to the network camera 2 that, for example, video images may be first turned into black and white and thus the largest execution priority number 1000 in this table is assigned, that the video images may further undergo frame rate reduction, and that their image quality may also be compromised. In addition, in case a further bandwidth reduction might be required, the table is created on the assumption that video images from the network camera 3 may be turned into black and white in anticipation of operations where color images from only one network camera in a single area would be enough to be interpolated. This example table also gives last options to halve a bit rate, taking into account degradation of image quality in the worst case.

[Operations of the Exemplary Embodiment]

Figure 10:
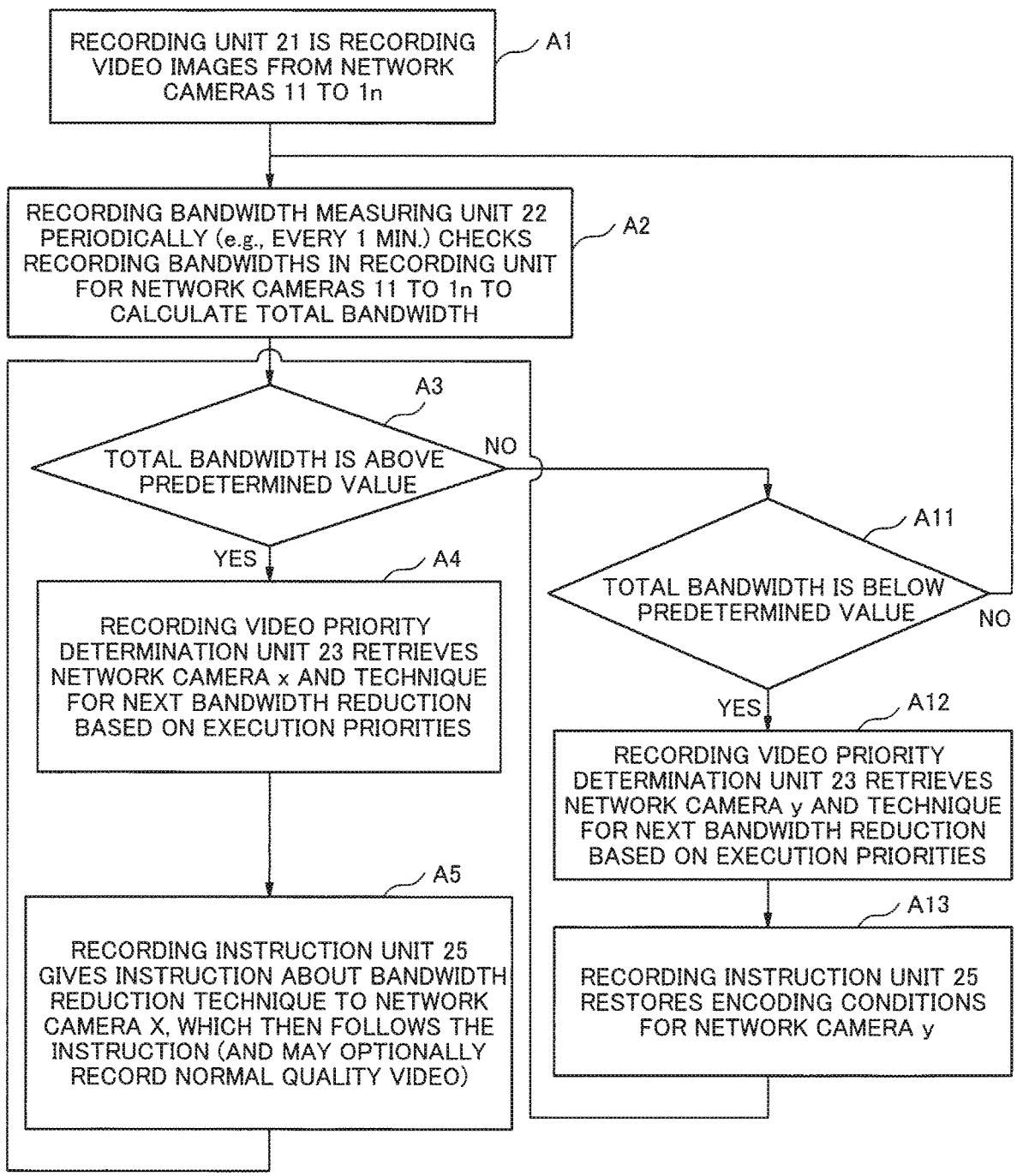
FIG. 10 is a flowchart illustrating example operations according to the second exemplary embodiment of the present invention.

FIG. 10 is an explanatory diagram illustrating operations of this exemplary embodiment. In Step A1, the recording unit 21 is receiving and recording video images delivered from the network cameras 11 to 1n.

Next, in Step A2, the recording bandwidth measuring unit 22 periodically checks the bandwidths for all the network cameras 11 to 1n. The measurement may be made at intervals of one minute, for example. The unit 22 calculates the total sum of the bandwidths while checking the respective bandwidths.

It is assumed that a threshold value (hereinafter referred to as the first threshold value) which well covers a certain bandwidth is predetermined based on a maximum amount of data acceptable to the network that delivers data from the network cameras to the recording device 2. The first threshold value may be, for example, a fixed value if the bandwidth is expected to be constant within an intranet or the like. In Step A3, it is determined whether the total bandwidth calculated in Step A2 is above the first threshold value. If Yes, in Step A4, the recording video priority determination unit 23 retrieves, based on the execution priorities, a technique to be used for the next bit rate reduction from among the corresponding network cameras whose video images are currently being recorded. In this exemplary embodiment, the execution priorities are predetermined for every network camera and for every technique for bit rate reduction and are contained in the execution priority table 26.

The recording video priority determination unit 23 looks up the priorities in this table to reduce bit rates in the order of higher to lower execution priorities. Actually, the recording video priority determination unit 23 by itself memorizes the current execution priority and technique in progress, on the basis of which the unit 23 retrieves the network camera (hereinafter referred to as the network camera x) and technique corresponding to the next highest priority. The execution priority table 26 will be larger in size for a greater number of working network cameras, but the table would still work well because its size is not large compared with the amount of video image data processed. However, if a much higher speed is desired, the table search could be enhanced by sorting the table by network camera ID and by using the network camera IDs for key hashing.

In Step A5, the technique and network camera x as determined in Step A4 are given as an instruction to the network camera x, which in turn follows the instruction.

Taking this step allows for bit rate reduction depending on the characteristics of video images while inhibiting reduction in information level provided by the video images as a whole.

On the other hand, if the total bandwidth is determined not to exceed the first threshold value in Step A3, the subsequent operations are as follows. Another threshold value (hereinafter referred to as the second threshold value) is determined, for example, beforehand, based on a maximum amount of data permissible to the network that delivers data from the network cameras to the recording device, so that it can be decided to increase the delivery bandwidth for the reason that there is a sufficient amount of available total bandwidth to receive data from the network cameras. In Step A11, it is determined whether the total bandwidth is below the second threshold value, i.e., whether there is an extra available bandwidth. If the total bandwidth is below the second threshold value, then in Step A12, in contrast to Step A4, the recording video priority determination unit 23 retrieves a higher-priority network camera (hereinafter referred to as the network camera Y) from among those cameras which have already undergone degradation of image quality, from the execution priority table 26 shown in FIG. 8. In Step A13, the recording instruction unit 25 restores the network camera Y to the previous good image quality condition.

[Effect of the Exemplary Embodiment]

This exemplary embodiment makes it possible to reduce the total bandwidth for recording images captured by network cameras, eliminate the need for taking into account individual maximum bandwidths for every network camera when building a network, and decrease the cost of constructing the network.

This exemplary embodiment also makes it possible to reduce the number of network cameras that have influence on video images while minimizing degradation of information level and quality provided by video images due to the fact that this exemplary embodiment reduces bandwidths for some of the network cameras depending on the importance of individual network cameras and the content of video images.

Furthermore, if there is an extra available bandwidth, this exemplary embodiment provides the side benefit of recording high-quality video images by making the most of the network bandwidth.

Third Exemplary Embodiment

While in the above-described exemplary embodiments instructions about the technique to reduce a bandwidth are given from the recording device side, in this exemplary embodiment a network camera makes the decision about the technique.

Figure 11:
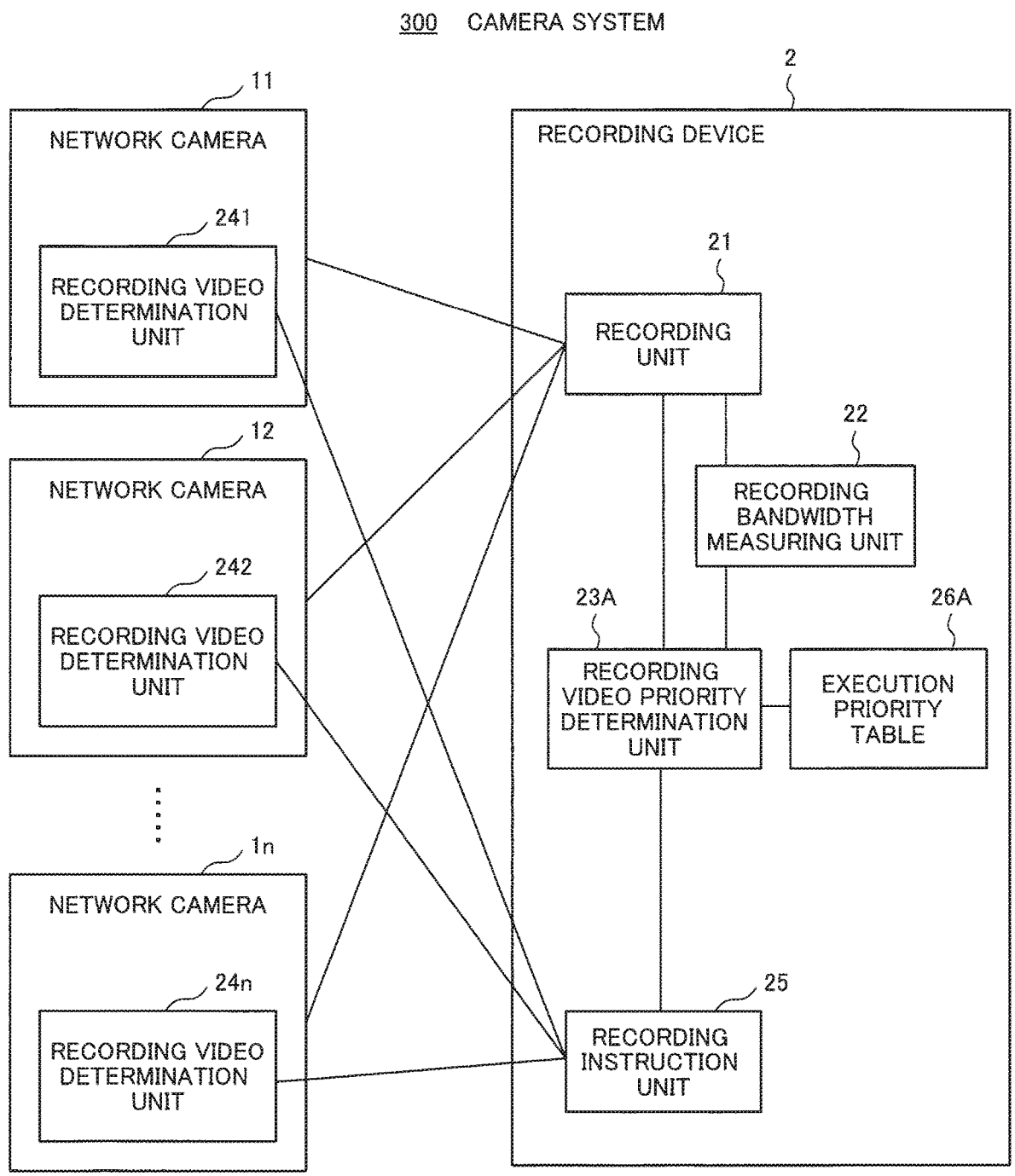
FIG. 11 is a block diagram illustrating a third exemplary embodiment of the present invention.

FIG. 11 is a block diagram illustrating a camera system 300 according to this exemplary embodiment with identical components denoted by identical reference numbers as shown in FIG. 7, and additionally the recording video priority determination unit, the execution priority table, and the recording video determination unit are represented by 23A, 26A, and 241, respectively. In this exemplary embodiment, the recording video determination unit 214 is newly added to the network cameras as shown in FIG. 11. The recording video priority determination unit 23A in the recording device 2 does not manage techniques to reduce bandwidths but references the execution priority table 26A to select a network camera for which a bandwidth is to be reduced. Then, the recording instruction unit 25 gives an instruction to reduce the bandwidth to the selected network camera.

The execution priority table 26A contains execution priorities for each network camera as shown in FIG. 12. A specific technique to reduce the bandwidth is determined by the recording video determination unit 241 in a network camera. The recording video determination unit 241 provides bandwidth controls according to some rule that network cameras can use. For example, if a difference between individual video image frames (a simple example may be representing the color of each dot by numeric values and summing their differences) does not exceed a predetermined value, the unit 241 may regard the video images as being in less dynamic motion and thus reduce the frame rate.

Fourth Exemplary Embodiment

While in the above-described exemplary embodiments camera priorities or bandwidth reduction priorities are predetermined, in this exemplary embodiment these camera priorities or bandwidth reduction priorities are not predetermined but dynamically assigned based on the characteristics of video images currently being recorded.

Figure 13:
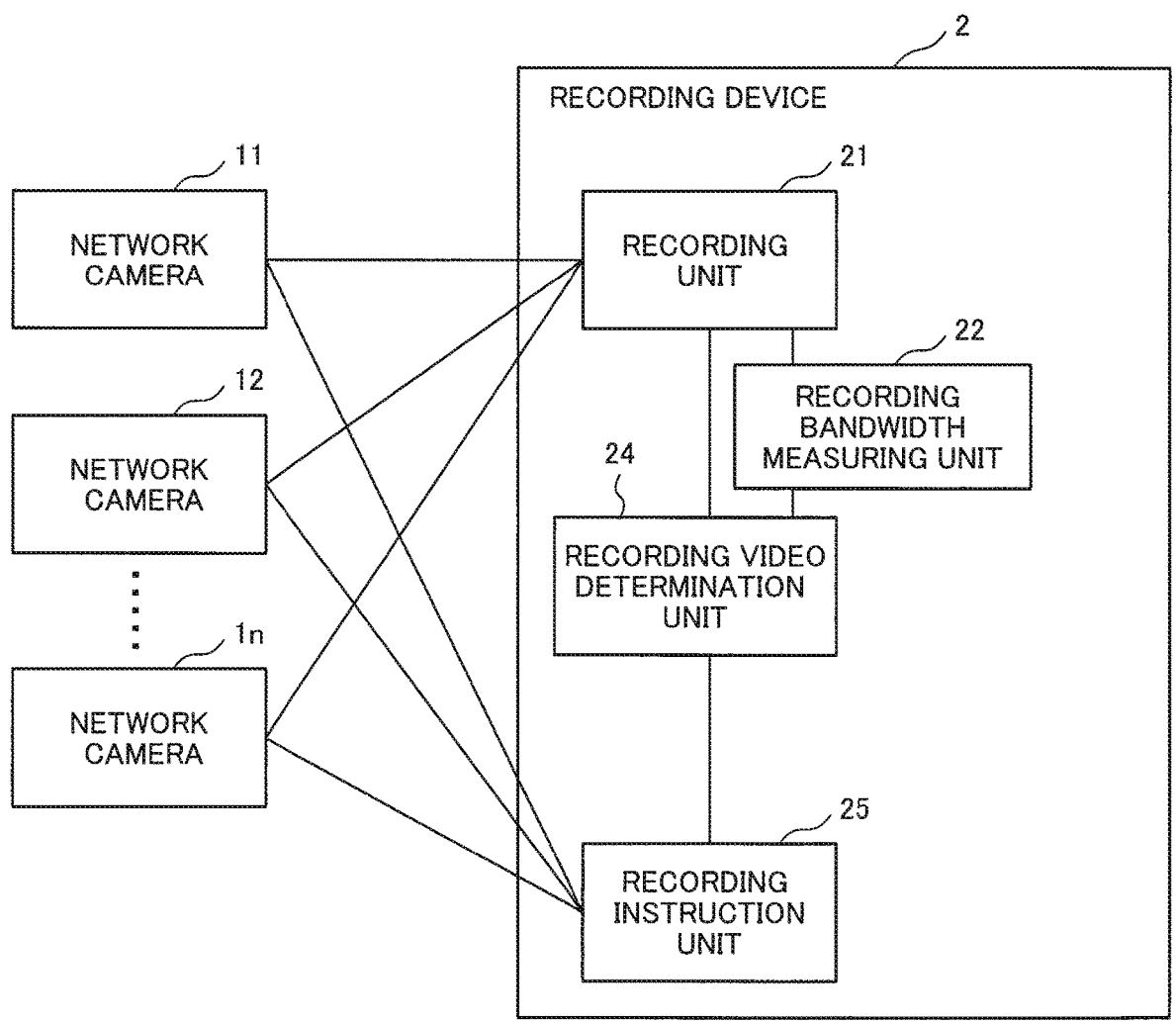
FIG. 13 is a block diagram illustrating a fourth exemplary embodiment of the present invention.

FIG. 13 is a block diagram illustrating a camera system 400 according to this exemplary embodiment with identical components denoted by identical reference numbers as shown in FIG. 7, and additionally a recording video determination unit is represented by 24. The recording video determination unit 24 dynamically determines priorities to the respective network cameras or bandwidth reduction priorities by analyzing the currently being recorded video images captured by the respective network cameras. For example, if there is no motion in video images encoded by a network camera, reducing a frame rate would have little influence on the images to be actually viewed. Thus, if a difference between individual video image frames (a simple example may be representing the color of each dot by numeric values and summing their differences) is less than a predetermined value, the recording video determining unit 24 may regard the video images as being in no motion, determine that a lower priority has been given to the network camera that is sending the image frames, and give an instruction to decrease the frame rate to the applicable network camera through the recording instruction unit 25.

Fifth Exemplary Embodiment

While in the exemplary embodiment shown in FIG. 7 bandwidth reduction priorities for the individual network cameras are predetermined as fixed values, in this exemplary embodiment the priorities are changed dynamically.

Figure 14:
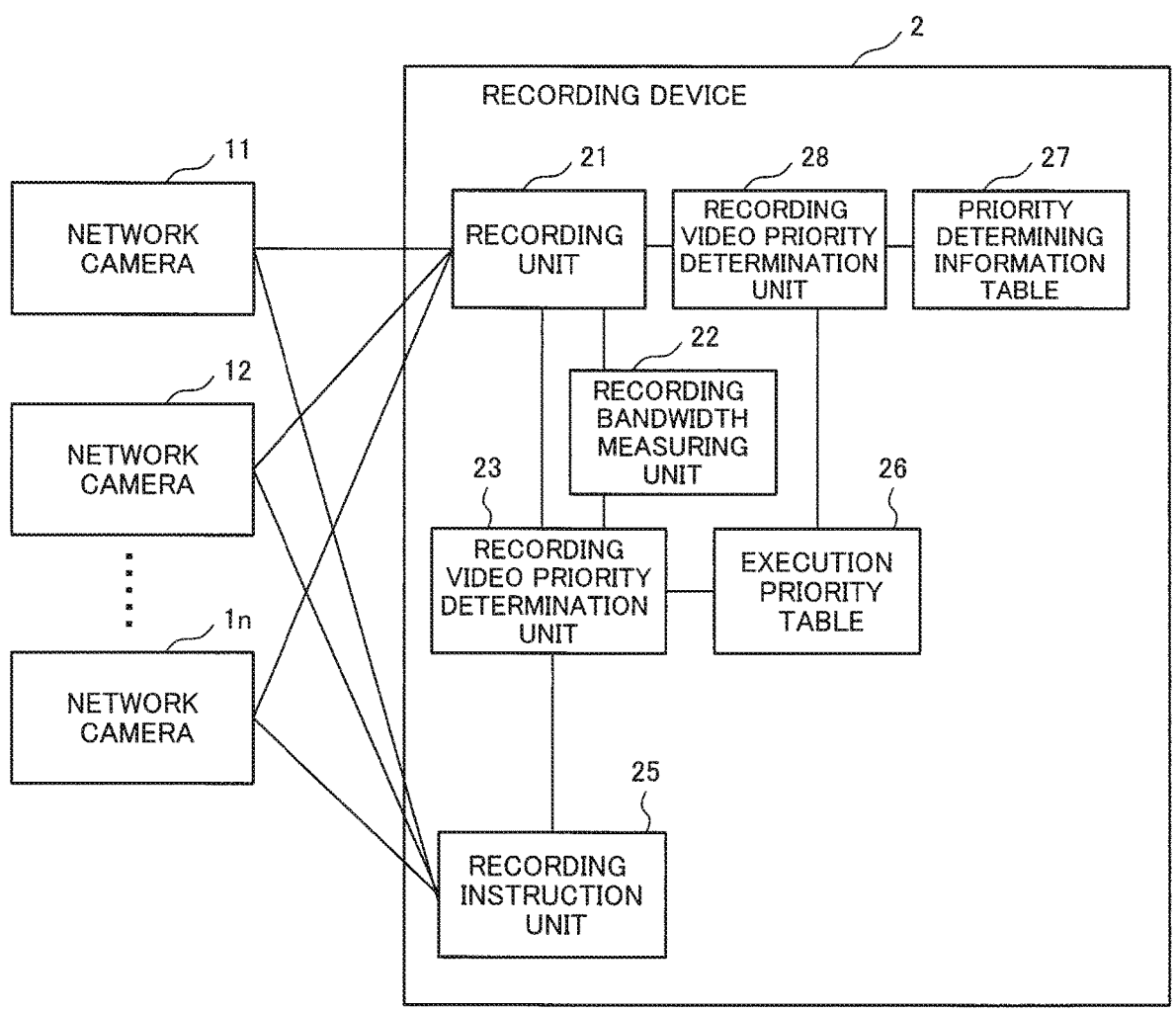
FIG. 14 is a block diagram illustrating a fifth exemplary embodiment of the present invention.

FIG. 14 is a block diagram illustrating a camera system 500 according to this exemplary embodiment with identical components denoted by identical reference numbers as shown in FIG. 7, and additionally a priority determining information table and a video priority determination unit are represented by 27 and 28, respectively. In this exemplary embodiment, the video priority determination unit 28 references the priority determining information table 27 to dynamically change the content of the execution priority table 26.

FIG. 15 is an example of the priority determining information table 27. This example table records network cameras and their respective priority time periods. The video priority determination unit 28 checks the current time, and when the time falls outside a priority time period, the unit 28 changes, for example, the respective execution priorities in the execution priority table 26 for the applicable network camera by applying equal scaling factors. When the time falls inside the time period, the unit 28 returns the execution priorities to their original values. In this way, this exemplary embodiment makes it possible to maintain levels of information provided by the video images as a whole by, for example, decreasing a bit rate of video images from a camera during a time period when no monitoring is needed.

Methods for dynamically changing execution priorities are not limited to those described above. For example, the video priority determination unit 28 may be adapted to dynamically change the content of the execution priority table 26 based on results of analysis on video signals recorded in the recording unit 21 or on the results along with the information contained in the priority determining information table 27.

Sixth Exemplary Embodiment

In this exemplary embodiment, which envisages that a network camera and a recording device are connected to each other via a network such as the Internet, provides the ability to dynamically determine a first threshold value used for starting bandwidth restriction and a second threshold value used for determining whether to cancel the bandwidth restriction, based on the fluctuating available network bandwidth.

Figure 16:
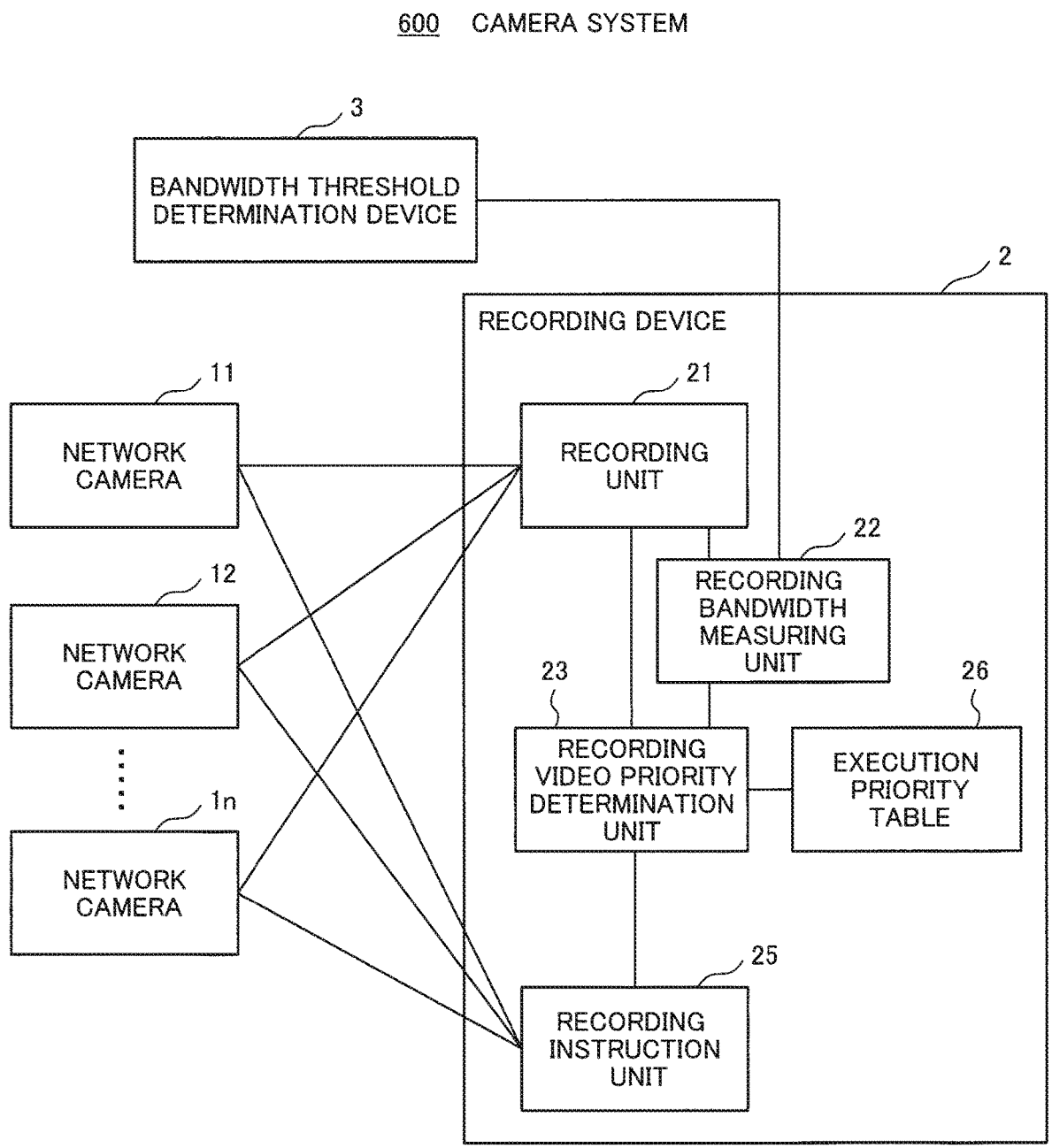
FIG. 16 is a block diagram illustrating a sixth exemplary embodiment of the present invention.

FIG. 16 is a block diagram illustrating a camera system 600 according to this exemplary embodiment with identical components denoted by identical reference numbers as shown in FIG. 7, and additionally a bandwidth threshold determination device is represented by 3. The bandwidth threshold determination device 3 measures a communication bandwidth permissible to the network at intervals of one minute or the like, and allocates, for example, 80 percent of the measured bandwidth to a first threshold value to be used for Step A3 in FIG. 10 and 50 percent of the measured bandwidth to a second threshold value to be used for Step A11 in FIG. 10, and then notifies the recording video priority determination unit 23 in the recording device 2 of these first and second threshold values. In this way, this exemplary embodiment can cope with the varying available network bandwidth.

Other Exemplary Embodiments

The present invention has been described with some exemplary embodiments above, but the invention is not limited to these exemplary embodiments and allows for various other additions or modifications. For example, each of the above exemplary embodiments may have a mechanism for recording normal quality video images on the network camera side so that video images of normal quality may be obtained during bandwidth reduction. In this case, the exemplary embodiments may also have a mechanism for delivering the video images of normal quality from network cameras to the receiving device 103 or the recording device 2 when there is an extra available bandwidth in the total bandwidth.

The present invention has the benefit of priority based on Japanese Patent Application No. 2012-230424 filed on Oct. 18, 2012 in Japan, the entire content of which is herein incorporated.

INDUSTRIAL APPLICABILITY

The present invention can be utilized for applications that include simultaneous recording or displaying of video images captured by a plurality of cameras for video monitoring or the like.

The whole or part of the above exemplary embodiments can be described as, but is not limited to, the following supplementary notes.

[Supplementary Note 1]
A camera system including:
a plurality of cameras each of which encodes video signals captured and sends encoded video signals, the encoding being performed with one of a plurality of variable bit rate encoding schemes whose average bit rates are different from one another; and
a receiving device connected to the plurality of cameras via a network, the receiving device including:
 a measuring unit which periodically measures a total bandwidth of the video signals received from the plurality of cameras via the network; and
 a control unit which, if the measured total bandwidth of the video signals is above a first threshold value, switches from the variable bit rate encoding scheme used for the individual cameras to another one having a lower average bit rate until the total bandwidth of the video images falls below the first threshold value, and which, if the measured total bandwidth of the video signals is below a second threshold value that is equal to or less than the first threshold value, switches from the variable bit rate encoding scheme used for the individual cameras to another one having a higher average bit rate; provided that this switching is directed to those cameras which have already switched from the variable bit rate encoding scheme used for the individual cameras to another one having a non-highest average bit rate.

[Supplementary Note 2]
The camera system according to Supplementary Note 2, wherein the control unit in the receiving device performs the switching from the variable bit rate encoding scheme used for the individual cameras to another one having a lower average bit rate in the order of lower to higher priorities given to the cameras, and performs the switching from the variable bit rate encoding scheme used for the individual cameras to another one having a higher average bit rate in the order of higher to lower priorities given to the cameras.

[Supplementary Note 3]
The camera system according to Supplementary Note 1 or 2,
wherein the plurality of variable bit rate encoding schemes having average bit rates different from one another include any two of the following:
 a first variable bit rate encoding scheme;
 a second variable bit rate encoding scheme halving a frame rate compared with the first variable bit rate encoding scheme;
 a third variable bit rate encoding scheme being different from the first variable bit rate encoding scheme in viewpoint about whether to encode video images into color or black-and-white video images; and a fourth variable bit rate encoding scheme being different from the first variable bit rate encoding scheme in quantization step size.

[Supplementary Note 4]

The camera system according to Supplementary Note 2, wherein the priorities are preassigned to combinations of the cameras and the variable bit rate encoding schemes.

[Supplementary Note 5]

The camera system according to Supplementary Note 2 or 4, wherein the control unit changes the priorities depending on information about priority time periods for the individual cameras.

[Supplementary Note 6]

The camera system according to Supplementary Note 2 or 4, wherein the control unit determines the priorities depending on an extent of change in video signals received from the cameras.

[Supplementary Note 7]

The camera system according to any one of claims 1 to 6, further including:

a bandwidth threshold determination device which measures an available bandwidth of the network and determines the first and second threshold values based on a result of the measurement.

[Supplementary Note 8]

The camera system according to any one of claims 1 to 7, wherein the receiving device further includes a recording unit which records the video signals received from the cameras.

[Supplementary Note 9]

A receiving device including:

a measuring unit which is connected via a network to a plurality of cameras each of which encodes video signals captured and sends encoded video signals, the encoding being performed with one of a plurality of variable bit rate encoding schemes whose average bit rates are different from one another, and which periodically measures a total bandwidth of the video signals received from the plurality of cameras via the network; and a control unit which, if the measured total bandwidth of the video signals is above a first threshold value, switches from the variable bit rate encoding scheme used for the individual cameras to another one having a lower average bit rate until the total bandwidth of the video images falls below the first threshold value, and which, if the measured total bandwidth of the video signals is below a second threshold value that is equal to or less than the first threshold value, switches from the variable bit rate encoding scheme used for the individual cameras to another one having a higher average bit rate; provided that this switching is directed to those cameras which have already switched from the variable bit rate encoding scheme used for the individual cameras to another one having a non-highest average bit rate.

[Supplementary Note 10]

The receiving device according to Supplementary Note 9, wherein the control unit performs the switching from the variable bit rate encoding scheme used for the individual cameras to another one having a lower average bit rate in the order of lower to higher priorities given to the cameras, and performs the switching from the variable bit rate encoding scheme used for the individual cameras to another one having a higher average bit rate in the order of higher to lower priorities given to the cameras.

[Supplementary Note 11]

The receiving device according to Supplementary Note 9 or 10, wherein the plurality of variable bit rate encoding schemes having average bit rates different from one another include any two of the following:

a first variable bit rate encoding scheme;

a second variable bit rate encoding scheme halving a frame rate compared with the first variable bit rate encoding scheme;

a third variable bit rate encoding scheme being different from the first variable bit rate encoding scheme in viewpoint about whether to encode video images into color or black-and-white video images; and a fourth variable bit rate encoding scheme being different from the first variable bit rate encoding scheme in quantization step size.

[Supplementary Note 12]

The receiving device according to Supplementary Note 10, wherein the priorities are preassigned to combinations of the cameras and the variable bit rate encoding schemes.

[Supplementary Note 13]

The receiving device according to Supplementary Note 10 or 12, wherein the control unit changes the priorities depending on information about priority time periods for the individual cameras.

[Supplementary Note 14]

The receiving device according to Supplementary Note 10 or 12, wherein the control unit determines the priorities depending on an extent of change in video signals received from the cameras.

[Supplementary Note 15]

The receiving device according to any one of claims 9 to 14, further being connected to:

a bandwidth threshold determination device which measures an available bandwidth of the network and determines the first and second threshold values based on a result of the measurement.

[Supplementary Note 16]

The receiving device according to any one of claims 9 to 15, further including:

a recording unit which records the video signals received from the cameras.

[Supplementary Note 17]

A method for controlling a camera system including that:

each of a plurality of cameras encodes video signals captured and sends encoded video signals to a receiving device via a network, the encoding being performed with one of a plurality of variable bit rate encoding schemes whose average bit rates are different from one another;

the receiving device periodically measures a total bandwidth of the video signals received from the plurality of cameras via the network;

if the measured total bandwidth of the video signals is above a first threshold value, the receiving device switches from the variable bit rate encoding scheme used for the individual cameras to another one having a lower average bit rate until the total bandwidth of the video signals falls below the first threshold value; and the measured total bandwidth of the video signals is below a second threshold value that is equal to or less than the first threshold value, the receiving device switches from the variable bit rate encoding scheme used for the individual cameras to another one having a higher average bit rate;

provided that this switching is directed to those cameras which have already switched from the variable bit rate encoding scheme used for the individual cameras to another one having a non-highest average bit rate.

[Supplementary Note 18]

A program causing a computer, which is connected via a network to a plurality of cameras each of which encodes video signals captured and sends encoded video signals, the encoding being performed with one of a plurality of variable bit rate encoding schemes whose average bit rates are different from one another, to function as:

a measuring unit which periodically measures a total bandwidth of the video signals received from the plurality of cameras via the network; and a control unit which, if the measured total bandwidth of the video signals is above a first threshold value, switches from the variable bit rate encoding scheme used for the individual cameras to another one having a lower average bit rate until the total bandwidth of the video images falls below the first threshold value, and which, if the measured total bandwidth of the video signals is below a second threshold value that is equal to or less than the first threshold value, switches from the variable bit rate encoding scheme used for the individual cameras to another one having a higher average bit rate; provided that this switching is directed to those cameras which have already switched from the variable bit rate encoding scheme used for the individual cameras to another one having a non-highest average bit rate.

[Supplementary Note 19]

The camera system, the receiving device, the method for controlling a camera system, or the program according to any one of claims 1 to 18, including: a bandwidth threshold determination device which measures an available bandwidth of the network and determines the first and second threshold values based on a result of the measurement.

REFERENCE SIGNS LIST

100 Camera system
101 Camera
102 Network
103 Receiving device
104 Measuring unit
105 Control unit

The invention claimed is:

1. A method for controlling a camera system, the method comprising:
 receiving video signals from one or more cameras via network, each of the video signals being encoded with one of a plurality of encoding schemes;
 providing, to the one or more cameras via network, a first signal if a total bandwidth of the video signals is above a first threshold value; and
 providing, to the one or more cameras via network, a second signal if the total bandwidth is below a second threshold value, wherein:
 the first signal is provided to change an encoding scheme in use to another encoding scheme using lower bit rate;
 the second signal is provided to change the encoding scheme in use to another encoding scheme using higher bit rate; and
 the first signal is repeatedly provided until the total bandwidth falls below the first threshold value and the second signal is repeatedly provided until the total bandwidth is not less than the second threshold value, wherein the plurality of encoding schemes include one or more variable bit rate encoding schemes whose average bit rates are different from each other, wherein when switching the encoding scheme of the one or more cameras, determining priorities of the one or more cameras depending on an extent of change in video signals received from the cameras, and wherein the method further comprises recording normal quality video images by the one or more cameras during a period of bandwidth reduction.

2. The method for controlling the camera system according to claim 1, wherein
 the second threshold value is equal to or less than the first threshold value.

3. The method for controlling the camera system according to claim 1, further comprising:
 in response to the total bandwidth of the video signals being above the first threshold value, switching from the variable bit rate encoding scheme used for each camera to another one having a lower average bit rate in the order of lower to higher priorities given to the cameras, and
 in response to the total bandwidth being below the second threshold value, switching from the variable bit rate encoding scheme used for each camera to another one having a higher average bit rate in the order of higher to lower priorities given to the cameras.

4. The method for controlling the camera system according to claim 1, wherein
 the one or more variable bit rate encoding schemes whose average bit rates are different from each other comprise at least any two of the following:
 a first variable bit rate encoding scheme;
 a second variable bit rate encoding scheme having a frame rate which is one half of a frame rate of the first variable bit rate encoding scheme;
 a third variable bit rate encoding scheme encoding into black-and-white video images different from the first variable bit rate encoding scheme encoding into color video images; and
 a fourth variable bit rate encoding scheme having a quantization step size different from a quantization step size of the first variable bit rate encoding scheme.

5. A camera system comprising:
 one or more cameras each of which encodes, with one of a plurality of encoding schemes, signals captured and sends encoded video signals, wherein the plurality of encoding schemes comprises one or more variable bit rate encoding schemes whose average bit rates are different from each other; and
 a receiving device connected to the one or more cameras via a network, the receiving device comprising:
 a control unit which provides, to the one or more cameras via network, a first signal if a total bandwidth of the video signals is above a first threshold value; and
 which provides, to the one or more cameras via network, a second signal if the total bandwidth is below a second threshold value, wherein:
 the first signal is provided to change an encoding scheme in use to another encoding scheme using lower bit rate;
 the second signal is provided to change the encoding scheme in use to another encoding scheme using higher bit rate; and
 the first signal is repeatedly provided until the total bandwidth falls below the first threshold value and the second signal is repeatedly provided until the total bandwidth is not less than the second threshold value, wherein, when switching the encoding scheme of the one or more cameras, determining priorities of the one or more cameras depending on an extent of change in video signals received from the cameras, and wherein the one or more cameras record normal quality video images during a period of bandwidth reduction.

6. A receiving device comprising:

a control unit which encodes, with one of a plurality of encoding schemes, signals captured and sends encoded video signals, wherein the plurality of encoding schemes comprises one or more variable bit rate encoding schemes whose average bit rates are different from each other;

which provides, to one or more cameras via network, a first signal if a total bandwidth of the video signals is above a first threshold value; and which provides, to the one or more cameras via network, a second signal if the total bandwidth is below a second threshold value, wherein:

le;2qthe first signal is provided to change an encoding scheme in use to another encoding scheme using lower bit rate;

the second signal is provided to change the encoding scheme in use to another encoding scheme using higher bit rate; and the first signal is repeatedly provided until the total bandwidth falls below the first threshold value and the second signal is repeatedly provided until the total bandwidth is not less than the second threshold value, wherein, when switching the encoding scheme of the one or more cameras, determining priorities of the one or more cameras depending on an extent of change in video signals received from the cameras, and wherein the one or more cameras record normal quality video images during a period of bandwidth reduction.

* * * * *